US008842909B2

(12) United States Patent
Koo et al.

(10) Patent No.: US 8,842,909 B2
(45) Date of Patent: Sep. 23, 2014

(54) EFFICIENT BLENDING METHODS FOR AR APPLICATIONS

(75) Inventors: Hyung-Il Koo, Seoul (KR); Young-Ki Baik, Seoul (KR); Beom-Su Kim, Seoul (KR)

(73) Assignee: Qualcomm Incorporated, San Diego, CA (US)

( * ) Notice: Subject to any disclaimer, the term of this patent is extended or adjusted under 35 U.S.C. 154(b) by 315 days.

(21) Appl. No.: 13/283,462

(22) Filed: Oct. 27, 2011

(65) Prior Publication Data

US 2013/0004068 A1 Jan. 3, 2013

Related U.S. Application Data

(60) Provisional application No. 61/503,421, filed on Jun. 30, 2011.

(51) Int. Cl.
| | | |
|---|---|---|
| *G06K 9/00* | (2006.01) | |
| *G06K 9/34* | (2006.01) | |
| *G06K 9/32* | (2006.01) | |
| *G06F 17/28* | (2006.01) | |
| *G06T 11/60* | (2006.01) | |

(52) U.S. Cl.
CPC ............... *G06T 11/60* (2013.01); *G06K 9/342* (2013.01); *G06K 9/3258* (2013.01); *G06F 17/289* (2013.01)
USPC .......................................... 382/165; 382/176

(58) Field of Classification Search
USPC ................................................ 382/164–165
See application file for complete search history.

(56) References Cited

U.S. PATENT DOCUMENTS

| | | | | |
|---|---|---|---|---|
| 5,373,568 | A * | 12/1994 | Kato ............................. | 382/268 |
| 5,917,944 | A * | 6/1999 | Wakisaka et al. ............. | 382/190 |
| 6,429,875 | B1 * | 8/2002 | Pettigrew et al. ............. | 345/591 |
| 6,473,522 | B1 | 10/2002 | Lienhart et al. | |
| 6,577,762 | B1 | 6/2003 | Seeger et al. | |
| 7,606,419 | B2 | 10/2009 | Koshi et al. | |
| 2004/0086184 | A1 * | 5/2004 | Kondo et al. ................. | 382/203 |
| 2006/0078204 | A1 * | 4/2006 | Fujimoto et al. ............. | 382/202 |
| 2006/0204111 | A1 * | 9/2006 | Koshi et al. ................... | 382/229 |
| 2008/0187222 | A1 * | 8/2008 | Ernst et al. .................... | 382/180 |
| 2008/0233980 | A1 * | 9/2008 | Englund et al. ............... | 455/466 |
| 2008/0317342 | A1 * | 12/2008 | Fenchel et al. ................ | 382/173 |
| 2009/0055159 | A1 | 2/2009 | Kato | |
| 2009/0324078 | A1 * | 12/2009 | Wu et al. ....................... | 382/173 |
| 2010/0156919 | A1 | 6/2010 | Bala et al. | |
| 2011/0299766 | A1 * | 12/2011 | Wexler et al. ................. | 382/162 |
| 2012/0281909 | A1 * | 11/2012 | Hosoi ............................ | 382/159 |

OTHER PUBLICATIONS

International Search Report and Written Opinion—PCT/US2012/043876—ISA/EPO—Sep. 20, 2012.

(Continued)

*Primary Examiner* — Jingge Wu
(74) *Attorney, Agent, or Firm* — Kilpatrick Townsend and Stockton LLP

(57) ABSTRACT

The use of optical character recognition (OCR) in mobile devices is becoming prevalent with the increasing use of mobile devices. One important application for OCR in mobile devices is recognizing and translating the text to a language understandable by the user. Techniques are provided for replacing symbols in an image, while reducing the artifacts as a result of re-rendering of the background image.

28 Claims, 10 Drawing Sheets

(56) References Cited

OTHER PUBLICATIONS

Victor Fragoso et al., "Translate a Mobile Augmented Reality Translator" Applications of Computer Vision (WACV), 2011, IEEE workshop on, IEEE, Jan. 5, 2011, pp. 497-502, XP031913615, DOI : 10.1109/WACV.2011.5711545.

Doermann, et al., "Progress in Camera-Based Document Image Analysis," Proceedings of the Seventh International Conference on Document Analysis and Recognition (ICDAR 2003), IEEE, p. 1-11.

Fragoso, et al., "TranslatAR: A Mobile Augmented Reality Translator," IEEE Workshop on Applications of Computer Vision (WACV 2011), pp. 1-6.

Haritaoglu, "Scene Text Extraction and Translation for Handheld Devices," Proceedings of the 2001 IEEE Computer Society Conference on Computer Vision and Pattern Recognition (CVPR 2001), pp. 408-413.

* cited by examiner

EFFICIENT BLENDING METHODS FOR AR APPLICATIONS

CROSS-REFERENCES TO RELATED APPLICATIONS

This application claims priority to U.S. Provisional Application No. 61/503,421 entitled "Efficient Blending Methods for AR Applications," filed Jun. 30, 2011. The U.S. Provisional Application No. 61/503,421 is assigned to the assignee of the present invention, and is hereby incorporated by reference.

BACKGROUND OF THE INVENTION

Embodiments of the invention relate to the field of augmented reality. Augmented reality allows a device such as a mobile device to augment the reality of a user's surroundings. Recognizing text in the field of view of a camera mounted on a mobile device by using optical character recognition (OCR) enables important applications in the realm of augmented reality by providing the user more information about the text and its context. The use of OCR in mobile devices is becoming prevalent with the increasing use of mobile devices. An important application for OCR in mobile devices is recognizing and translating the text to a language understandable by the user.

One of the hurdles in translating text and re-rendering the text and the background of the text is the introduction of undesirable and annoying artifacts in the background that result from the re-rendering of the background. Furthermore, the computing power on the mobile devices is limited, so the process of replacing the text with the translated text without leaving artifacts must not be computationally complex and drain excessive power.

SUMMARY

Techniques are provided for replacing symbols in an image, while reducing the artifacts as a result of re-rendering of the background image. Generally, this technique can be applied to image processing.

In one embodiment of the invention, while translating and replacing the text, the effect of the artifacts on the background are reduced by regenerating the background using interpolation. In one aspect, linear interpolation is used. Alternatively, non-linear interpolation can also be used. In yet another embodiment, the invention describes the process of finding an optimized path that avoids the noisy paths, and thus, allows for interpolation with very few annoying artifacts.

An example of a method for replacing an at least one symbol in a first image includes: obtaining the first image comprising a plurality of pixels representing the at least one symbol and a plurality of pixels representing a background area; defining a first and a second boundary in the first image, wherein the first and the second boundaries are positioned on opposite sides of the at least one symbol representing the first image; generating a plurality of pixels representing an at least one translated symbol of the at least one symbol; generating a plurality of pixels representing an augmented version of the background area, by interpolating a plurality of background pixel values between the first and the second boundaries; and constructing a second image comprising the plurality of pixels representing the at least one translated symbol and the plurality of pixels representing the augmented version of the background area. In one aspect, the at least one symbol comprises an at least one text character in a first human language, and the at least one translated symbol comprises an at least one text character in a second human language.

In some embodiments, each of the first and second boundaries can be defined as a string of pixels along one side of the at least one symbol. In addition, the string of pixels can be defined as a path of pixels that minimizes a sum of gradient change in pixel color of a plurality of pixels along the path.

Implementation of defining the first and the second boundary in the first image may include: defining a first and a second band at opposing sides of the at least one symbol; selecting at least a first path that traverses through the first band and at least a second path that traverses through the second band; deriving a cost for the at least first path and the at least second path by summing gradient change in pixel color of a plurality of pixels along each path; and selecting the path with the lowest cost from the first band as the first boundary and the path with the lowest cost from the second band as the second boundary.

In some implementations, interpolating background pixel values utilizes linear interpolation. In other implementations, interpolating background pixel values utilizes non-linear interpolation. Additionally, the at least one symbol comprises an at least one text character in a first human language, and the at least one translated symbol comprises an at least one text character in a second human language.

An example device implementing the system may include a processor; an input device coupled to the processor; an output device coupled to the processor; and a non-transitory computer readable storage medium coupled to the processor, wherein the non-transitory computer readable storage medium comprises code executable by the processor for implementing a method comprising: obtaining a first image comprising a plurality of pixels representing an at least one symbol and a plurality of pixels representing a background area; defining a first and a second boundary in the first image, wherein the first and the second boundaries are positioned on opposite sides of the at least one symbol representing the first image; generating a plurality of pixels representing an at least one translated symbol of the at least one symbol; generating a plurality of pixels representing an augmented version of the background area, by interpolating a plurality of background pixel values between the first and the second boundaries; and constructing a second image comprising the plurality of pixels representing the at least one translated symbol and the plurality of pixels representing the augmented version of the background area. In some aspects, the at least one symbol comprises an at least one text character in a first human language, and the at least one translated symbol comprises an at least one text character in a second human language.

Implementations of such a device may include one or more of the following features. Each of the first and second boundaries can be defined as a string of pixels along one side of the at least one symbol. In addition, the string of pixels can be defined as a path of pixels that minimizes a sum of gradient change in pixel color of a plurality of pixels along the path. The step of defining the first and the second boundary in the first image may include: defining a first and a second band at opposing sides of the at least one symbol; selecting at least a first path that traverses through the first band and at least a second path that traverses through the second band; deriving a cost for the at least first path and the at least second path by summing gradient change in pixel color of a plurality of pixels along each path; and selecting the path with the lowest cost from the first band as the first boundary and the path with the lowest cost from the second band as the second boundary. Interpolation of the background pixel values can be accomplished utilizing linear or non-linear interpolation.

An example non-transitory computer readable storage medium coupled to a processor, wherein the non-transitory computer readable storage medium comprises a computer program executable by the processor for implementing a method includes: obtaining a first image comprising a plurality of pixels representing an at least one symbol and a plurality of pixels representing a background area; defining a first and a second boundary in the first image, wherein the first and the second boundaries are positioned on opposite sides of the at least one symbol representing the first image; generating a plurality of pixels representing an at least one translated symbol of the at least one symbol; generating a plurality of pixels representing an augmented version of the background area, by interpolating a plurality of background pixel values between the first and the second boundaries; and constructing a second image comprising the plurality of pixels representing the at least one translated symbol and the plurality of pixels representing the augmented version of the background area. In some aspects, the at least one symbol in the computer program comprises an at least one text character in a first human language, and the at least one translated symbol comprises an at least one text character in a second human language.

Implementations of such a computer program product may include one or more of the following features. Each of the first and second boundaries can be defined as a string of pixels along one side of the at least one symbol. In addition, the string of pixels can be defined as a path of pixels that minimizes a sum of gradient change in pixel color of a plurality of pixels along the path. The step of defining the first and the second boundary in the first image may include: defining a first and a second band at opposing sides of the at least one symbol; selecting at least a first path that traverses through the first band and at least a second path that traverses through the second band; deriving a cost for the at least first path and the at least second path by summing gradient change in pixel color of a plurality of pixels along each path; and selecting the path with the lowest cost from the first band as the first boundary and the path with the lowest cost from the second band as the second boundary. Interpolation of the background pixel values can be accomplished utilizing linear or non-linear interpolation.

An example apparatus for replacing an at least one symbol in a first image, the method comprising: a means for obtaining the first image comprising a plurality of pixels representing the at least one symbol and a plurality of pixels representing a background area; a means for defining a first and a second boundary in the first image, wherein the first and the second boundaries are positioned on opposite sides of the at least one symbol representing the first image; a means for generating a plurality of pixels representing an at least one translated symbol of the at least one symbol; a means for generating a plurality of pixels representing an augmented version of the background area, by interpolating a plurality of background pixel values between the first and the second boundaries; and a means for constructing a second image comprising the plurality of pixels representing the at least one translated symbol and the plurality of pixels representing the augmented version of the background area. In one aspect, the at least one symbol comprises an at least one text character in a first human language, and the at least one translated symbol comprises an at least one text character in a second human language.

In the above example system, the step of defining the first and the second boundary in the first image may include: a means for defining a first and a second band at opposing sides of the at least one symbol; a means for selecting at least a first path that traverses through the first band and at least a second path that traverses through the second band; a means for deriving a cost for the at least first path and the at least second path by summing gradient change in pixel color of a plurality of pixels along each path; and a means for selecting the path with the lowest cost from the first band as the first boundary and the path with the lowest cost from the second band as the second boundary.

Implementations of such a system may include one or more of the following features. Each of the first and second boundaries can be defined as a string of pixels along one side of the at least one symbol. In addition, the string of pixels can be defined as a path of pixels that minimizes a sum of gradient change in pixel color of a plurality of pixels along the path. Interpolation of the background pixel values can be accomplished utilizing linear or non-linear interpolation.

The foregoing has outlined rather broadly the features and technical advantages of examples according to disclosure in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Embodiments of the invention include techniques for replacing symbols in an image, while reducing the artifacts as a result of re-rendering of the background image. The technique allows mobile phones the ability to translate symbols to readily recognizable symbols for the user. Generally, this technique can be applied to image processing.

Figure 1:
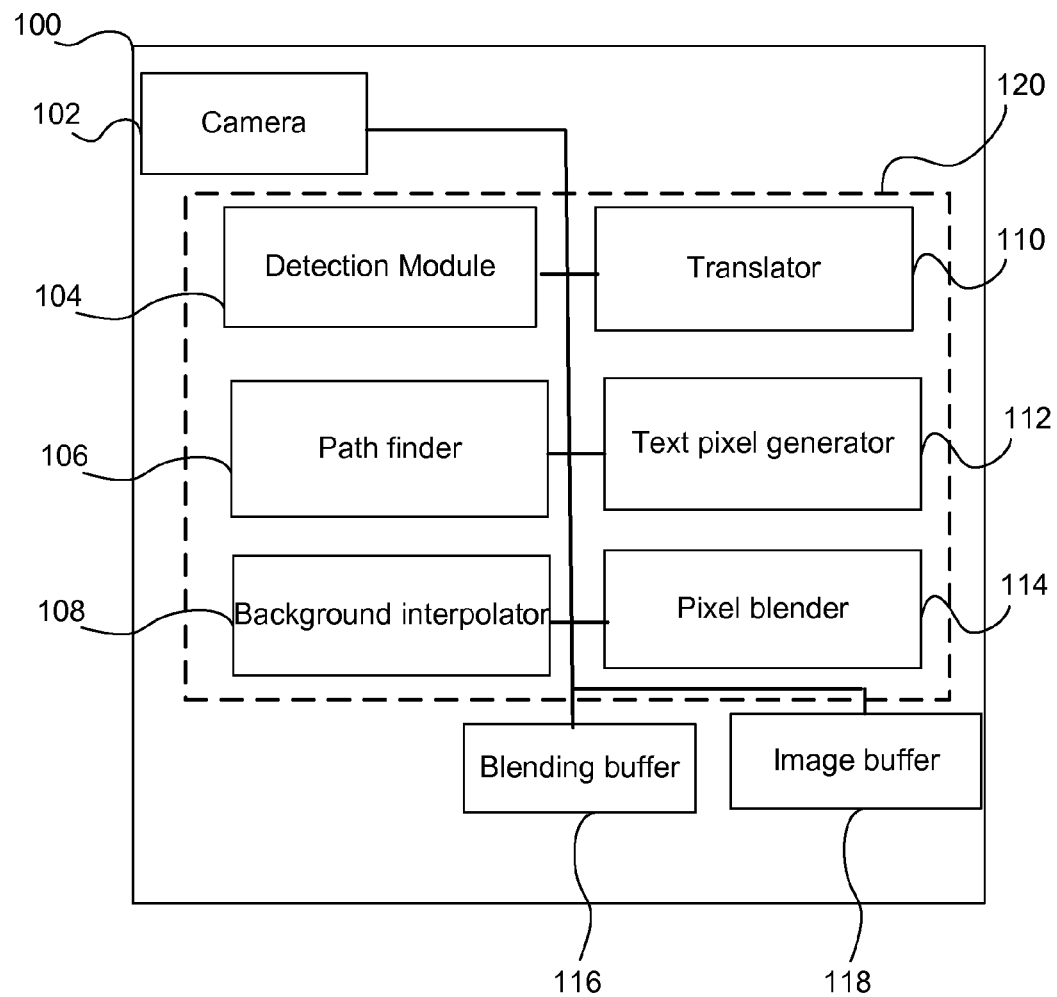
FIG. 1 is a simplified block diagram, illustrating an example of a blending system within a mobile device configured according to various embodiments of the invention.

FIG. 1 is a simplified block diagram, illustrating a non-limiting example of a blending system 120 within a device 100 configured according to various embodiments of the invention. In one embodiment, the device 100 is a mobile device enabled to perform a blending system 120 that translates and replaces symbols, while reducing artifacts as a result of the re-rendering of the background image. In some embodiments, the mobile device has a camera unit 102, a blending buffer 116, an image buffer 118 along with a blending system 120. The blending system 120 has a detection module 104, a path finder 106, a background interpolator 108, a translator 110, a text pixel generator 112, and a pixel blender 114. The device camera 102 captures images including symbols on a background and stores the images in the image buffer 118 for further processing. The image has symbols that can be any graphical representation, including text, characters and signs. The detection module 104 detects a translation area in the image that includes symbols and the background area. The path finder 106 finds two paths that isolate the symbols (vertically). These boundaries can be upper and lower boundaries of a detected box or they can be optimal paths (which will be discussed). The boundary can be a straight line or an optimized path that avoids dispersion of noise in the image. The background interpolator 108 re-renders the background by interpolating the pixel values between the first and the second boundaries. The background interpolator 108 may use linear interpolation, non-linear interpolation or any means suitable for re-rendering the background image and generating pixels for the background. The translator 110 may use OCR functionality to recognize the symbols. The translator 110 then translates the symbols. The text pixel generator 112 generates pixels for the translated text. The pixel blender 114 embeds the translated symbols in the background area in the blending buffer 116. The pixel blender 114 replaces the captured image from the image buffer 118 with the blended image before displaying it on the output device to the user.

Figure 2:
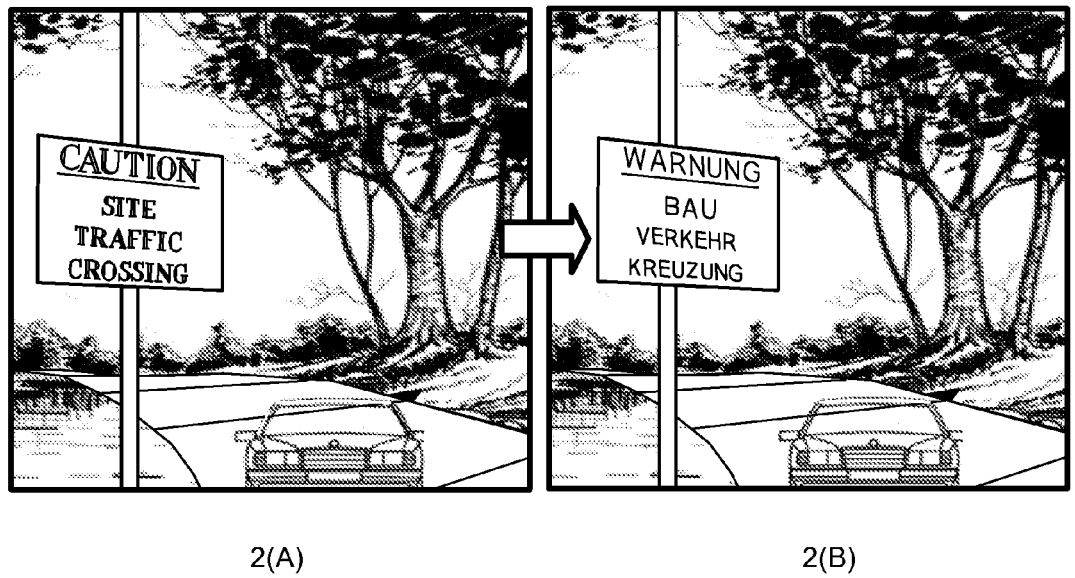
FIG. 2 is a graphical image, illustrating the transformation of the image captured by the camera device.

FIG. 2 is a graphical image, illustrating the transformation of the image captured by the camera 102. Referring to FIG. 2, 2(A) is the image detected by the camera of the device. After the image is detected and captured, the user may instruct the device to translate the text visible on the device through its output unit through a function menu or other suitable means. Alternatively, the device may translate the text without user intervention before displaying the image on the output screen. The user may put the device in a translation mode by using a function menu or any other suitable means before the device starts translating symbols in the view of the device. The user may also have the option of choosing the language or the system that the user needs the symbol translated to. For instance, the user may set the device to translate to language English (American) and American system. When the user is traveling in Japan, the device will translate Japanese visible in the field of view of the device to English and translate the road signs with Japanese symbols visible in the field of view of the device to American road signs recognizable to the user allowing an American user to comfortably travel in Japan.

Referring to FIG. 2, the device translates the symbols in the image from English to German. The blending system 120 described in FIG. 1, processes the image 2(A) containing the English text "CAUTION SITE TRAFFIC CROSSING." The device camera 102 captures images including the text and the background and stores the images in the image buffer 118 for further processing. The detection module 104 detects the phrase for translation from the image. The path finder 106 finds two paths that isolate the symbols (vertically). These paths can be upper and lower boundaries of a detected box or they can be optimal paths. The background interpolator 108 re-renders the background by interpolating the pixel values between the first and the second boundaries. The translator 110 uses OCR functionality to recognize the text. The translator 110 then translates the English text to German text. The text pixel generator 112 generates pixels for the translated text. The pixel blender 114 embeds the translated symbols in the background area in the blending buffer 116. The pixel blender 114 replaces the captured image from the image buffer 118 with the blended image. The blended image that is 2(B) is displayed to the user on the output device with the translated German text "WARNUNG BAU VERKEHR KREUZUNG."

Figure 3:
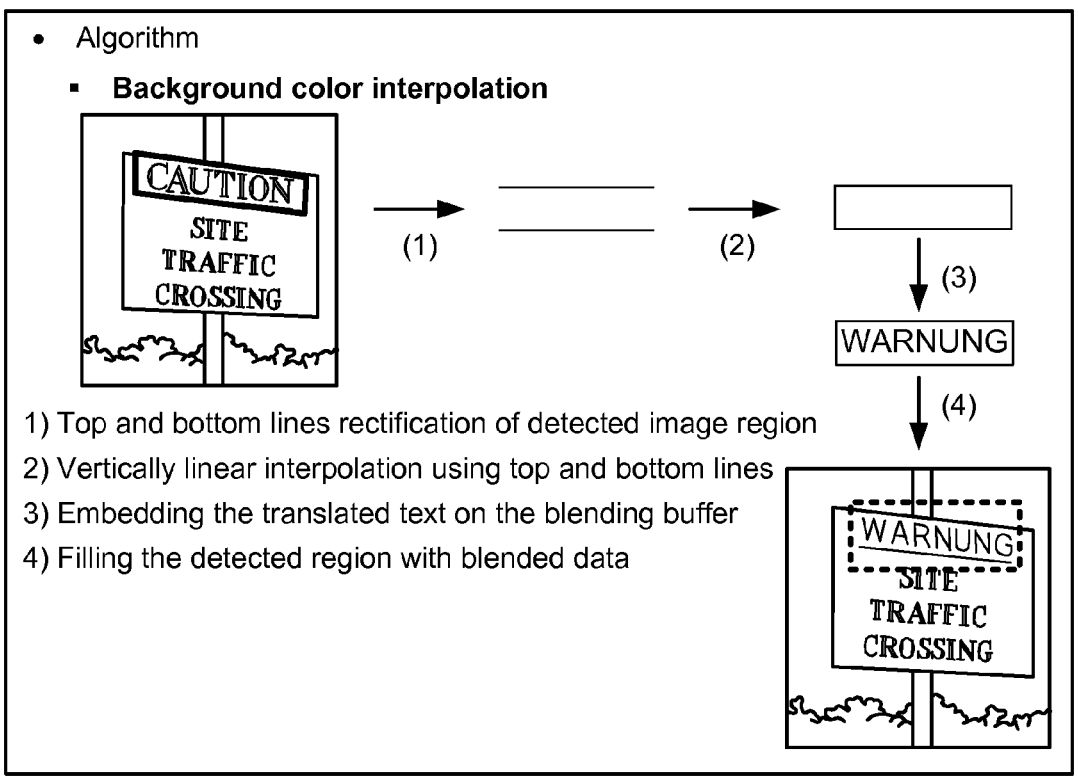
FIG. 3 is a graphical image, illustrating the steps of an example embodiment, using linear interpolation to translate between languages.

FIG. 3 is a graphical image, illustrating a non-limiting embodiment demonstrating the steps for translation and re-rendering of the background using linear interpolation. At step 1, the detection module 104 boxes out a section of the image containing text and background for translation. Two straight lines representing the boundaries at the top and the bottom edge of the text are selected. As shown in step 2, the background interpolator 108 regenerates the interior region using linear interpolation on the top and the bottom straight lines. The background interpolator 108 may use a linear-filtering mechanism that uses a moving average filter to remove noise. At step 3, the translator translates the English word "CAUTION" to the German word "WARNUNG." The pixel blender 114 embeds the resulting text in the background generated in step 2. At step 4, the pixel blender 114 replaces the boxed out region from step 1 with the data from the blending buffer.

Figure 4:
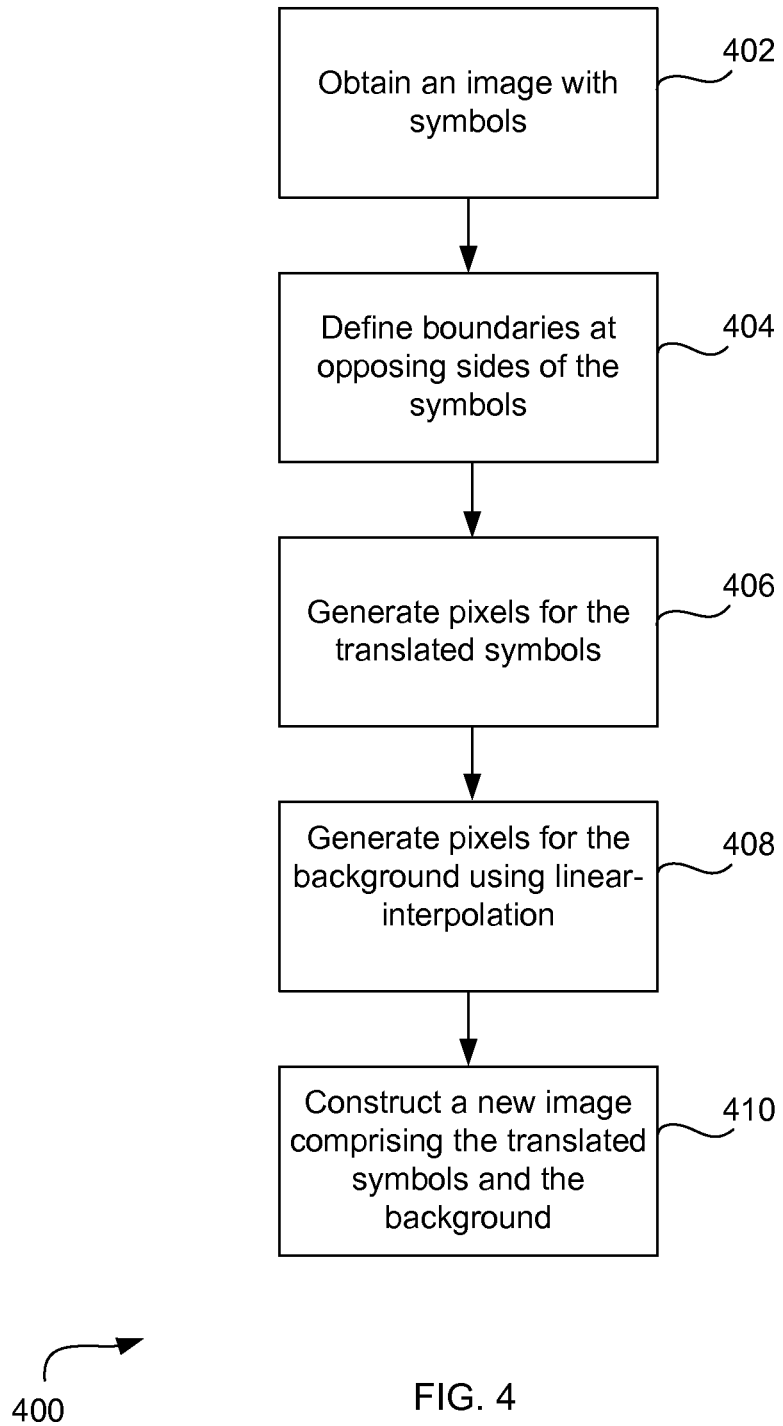
FIG. 4 is a simplified flow diagram, illustrating a process for replacing symbols in an image, while reducing the artifacts as a result of re-rendering of the background image using linear interpolation.

FIG. 4 is a simplified flow diagram, illustrating a method 400 for replacing symbols in an image, while reducing the artifacts as a result of re-rendering of the background image. The method 400 is performed by processing logic that comprise hardware (circuitry, dedicated logic, etc.), software (such as is run on a general purpose computing system or a dedicated machine), firmware (embedded software), or any combination thereof. In one embodiment, the method 400 is performed by device 1000 of FIG. 10.

Referring to FIG. 4, at block 402, the device camera 102 obtains an image comprising a plurality of pixels representing at least one symbol and a plurality of symbols representing a background area. For example, the image may be a bulletin board, a street sign, a book cover, or anything with symbols that need translation. At block 404, a path finder 106 positions a first and a second straight boundary on opposite sides of the symbols, vertically isolating the symbols. The path finder 106 may detect the gradient change between the region with the symbols and the region right after the symbols for placing the lines on each edge of the symbols. At block 406, the translator 110 translates the symbols from one language or system to another. The translator may use OCR techniques to first convert the symbols to a machine recognizable format representing the symbols. The translator may also use dictionaries and other various suitable means for translating language and symbols from one language or system to another. At block 406, the text pixel generator 112 also generates a plurality of pixels representing a translated symbol of at least one symbol. At block 408, a background interpolator 108 generates a plurality of pixels representing an augmented version of the background area, by linearly interpolating background pixel values between the first and the second boundaries. This method interpolates the interior region between the two boundaries around the symbols. The color interior to the box containing the boundaries can be interpolated since the color at the two boundaries is known. A linear-filtering mechanism that uses a moving average filter may be used to remove noise. Linear filtering is less complex and fast, however, it may still yield some annoying artifacts in the resulting translated image. Finally, at block 410, the pixel generator generates a new image comprising the plurality of pixels representing the translation of at least one symbol and the plurality of pixels representing the augmented version of the background area. In some embodiments, the pixels representing the translated symbols replace the background pixel.

It should be appreciated that the specific steps illustrated in FIG. 4 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 400.

Figure 5:
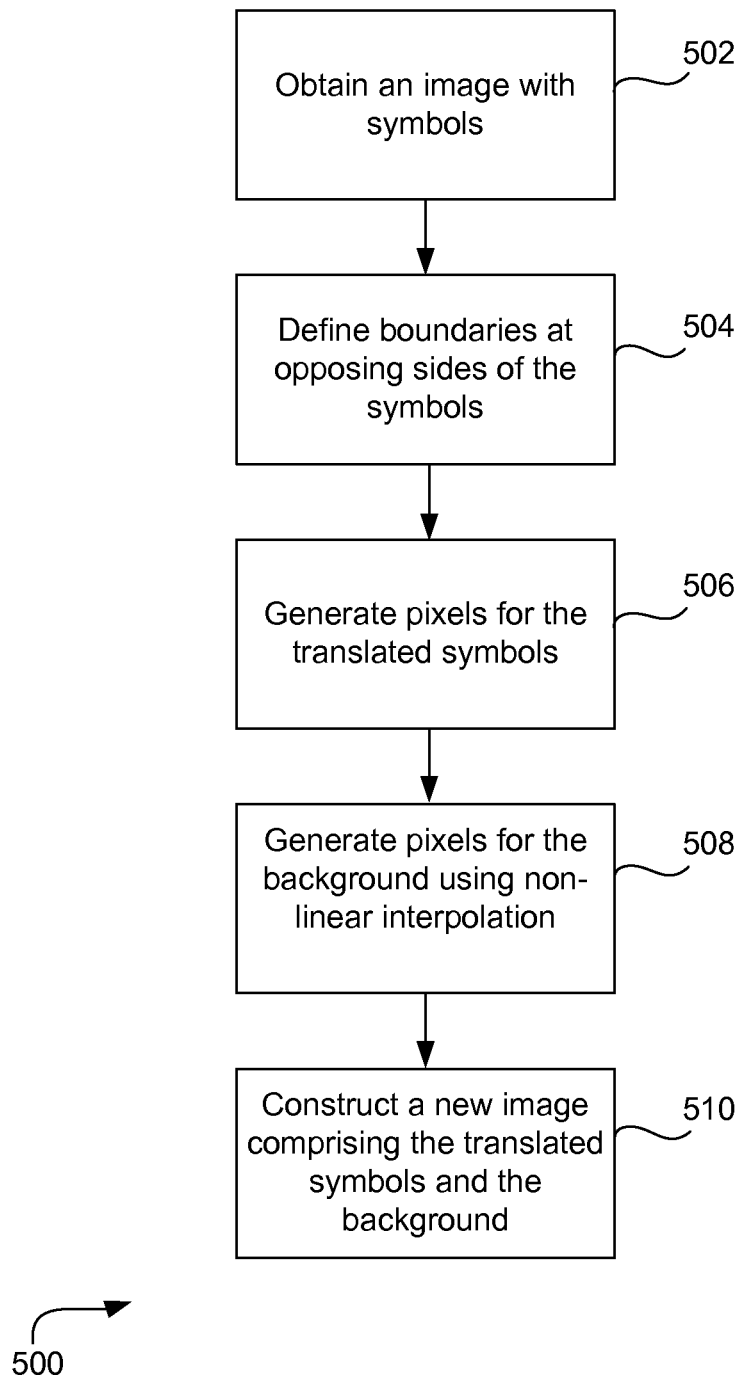
FIG. 5 is another simplified flow diagram, illustrating a process for replacing symbols in an image, while reducing the artifacts as a result of re-rendering of the background image using non-linear interpolation.

FIG. 5 is another simplified flow diagram, illustrating a method 500 for replacing symbols in an image, while reducing the artifacts as a result of re-rendering of the background image. The method 500 is performed by processing logic that comprise hardware (circuitry, dedicated logic, etc.), software (such as is run on a general purpose computing system or a dedicated machine), firmware (embedded software), or any combination thereof. In one embodiment, the method 500 is performed by device 1000 of FIG. 10.

Referring to FIG. 5, at block 502, the device camera 102 obtains an image comprising a plurality of pixels representing at least one symbol and a plurality of symbols representing a background area. For example, the image may be a bulletin board, a street sign, a book cover, or anything with symbols that need translation. At block 504, a path finder 106 positions a first and a second straight boundary on opposite sides of the symbols. The path finder 106 may detect the gradient change between the region with the symbols and the region right after the symbols for placing the lines on each side of the symbols. At block 506, the translator 110 translates the symbols from one language or system to another. The translator may use OCR techniques to first convert the symbols to a machine recognizable format representing the symbols. The translator may also use dictionaries and other various suitable means for translating language and symbols from one language or system to another. At block 506, the text pixel generator 112 also generates a plurality of pixels representing a translated symbol of at least one symbol. At block 508, a background interpolator 108 generates a plurality of pixels representing an augmented version of the background area, by non-linearly interpolating background pixel values between the first and the second boundaries. In non-linear filtering, outliers in background color (such as noise, reflections, and text color in adjacent text) are replaced with an estimated background color. This method can significantly reduce the artifacts with a small amount of computation overhead. Finally, at block 510, the pixel generator generates a new image comprising the plurality of pixels representing the translation of at least one symbol and the plurality of pixels representing the augmented version of the background area. In some embodiments, the pixels representing the translated symbols replace the background pixel.

It should be appreciated that the specific steps illustrated in FIG. 5 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 500.

Figure 6:
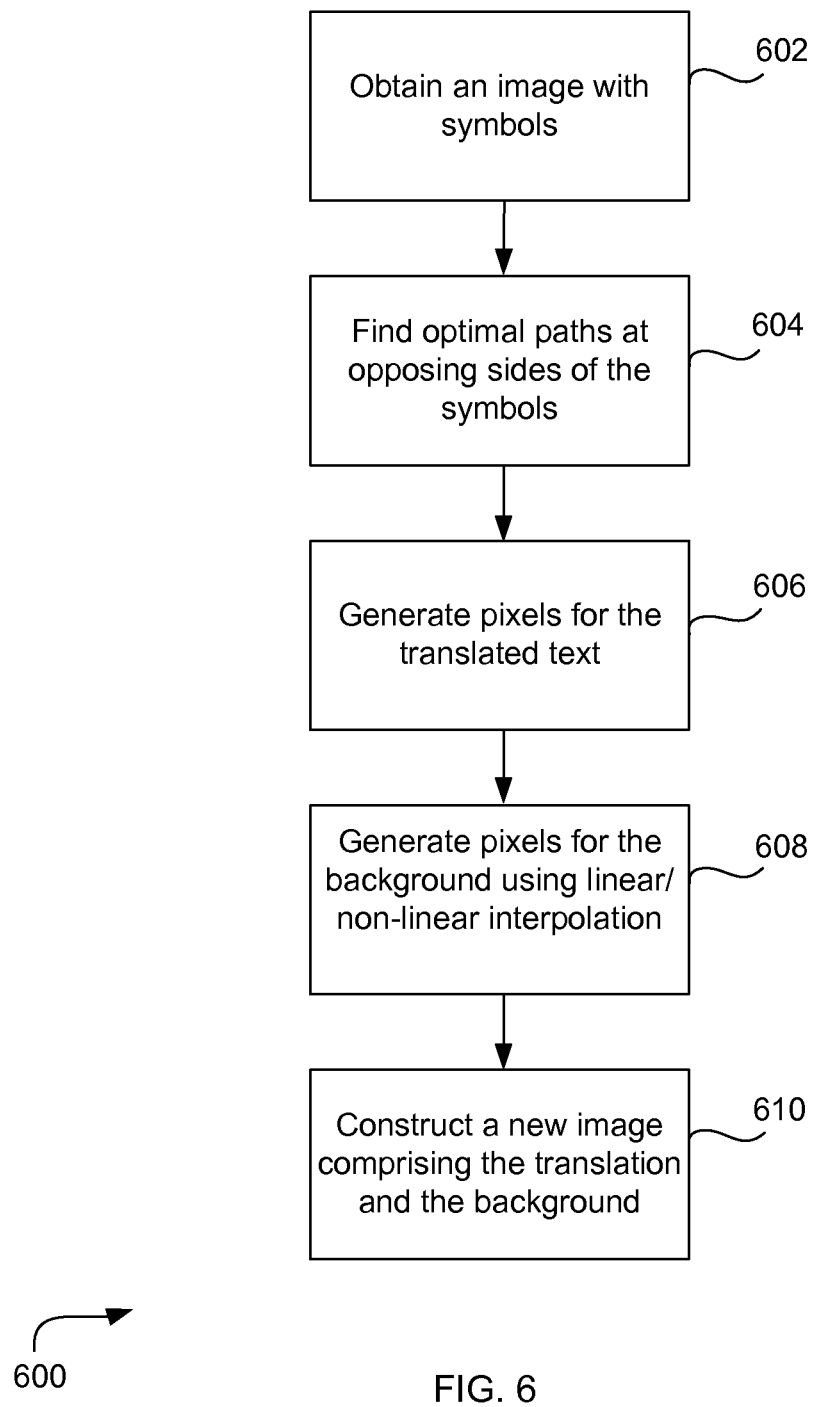
FIG. 6 is yet another simplified flow diagram, illustrating a process for replacing symbols in an image, while reducing the artifacts as a result of re-rendering of the background image using interpolation on an optimized path.

FIG. 6 is yet another simplified flow diagram, illustrating a process for replacing symbols in an image, while reducing the artifacts as a result of re-rendering of the background image using interpolation on an optimized path. The method 600 is performed by processing logic that comprise hardware (circuitry, dedicated logic, etc.), software (such as is run on a general purpose computing system or a dedicated machine), firmware (embedded software), or any combination thereof. In one embodiment, the method 600 is performed by device 1000 of FIG. 10.

Various interpolation and filtering mechanisms allow for better realization of the background by reducing the effects of noise and the resulting artifacts. However, another approach is to find optimal paths as boundaries that avoid paths with unwanted dispersion of noise and result in a background image with much fewer artifacts. Sequences of symbols have spacing on all four sides. This spacing provides for paths that can avoid noise from the symbols. Therefore, instead of solely relying on the interpolating algorithms to counteract the noise, one approach is to avoid the noisy paths with distortion altogether. The two boundaries that are used for interpolating the interior of the background are defined as a string of pixels that minimizes change in pixel value along the string of pixels. In other words, this embodiment focuses on finding an optimized path along the opposing sides of the symbols that avoids the symbols and noise in the path. The optimized path is used to interpolate the pixel values between the two boundaries. The (linear and non-linear) interpolation of the interior pixels using an optimized path significantly reduces artifacts in the final image.

Referring to FIG. 6, at block 602, the device camera 102 obtains an image comprising a plurality of pixels representing at least one symbol and a plurality of symbols representing a background area. For example, the image may be a bulletin board, a street sign, a book cover, or anything with symbols that need translation. At block 604, the path finder 106 positions a first and a second boundary on opposite sides of the symbols by finding optimal paths at opposing sides of the symbols. The path finder 106 finds an optimal path that avoids noisy paths and results in a background image with fewer artifacts. Exemplary embodiments for finding the optimal path are further discussed in FIG. 7, FIG. 8 and FIG. 9.

At block 606, the translator 110 translates the symbols from one language or system to another. The translator may use OCR techniques to first convert the symbols to a machine recognizable format representing the symbols. The translator may also use dictionaries and other various suitable means for translating language and symbols from one language or system to another. At block 606, the text pixel generator 112 also generates a plurality of pixels representing a translated symbol of the at least one symbol. At block 608, a background interpolator 108 generates a plurality of pixels representing an augmented version of the background area, by interpolating background pixel values between the first and the second boundaries. The background interpolator 108 may interpolate using linear interpolation, non-linear interpolation or any means suitable for re-rendering the background. Finally, at block 610, the pixel generator generates a new image comprising the plurality of pixels representing the translation of the at least one symbol and the plurality of pixels representing the augmented version of the background area. In some embodiments, the pixels representing the translated symbols replace the background pixel.

It should be appreciated that the specific steps illustrated in FIG. 6 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 600.

Figure 7:
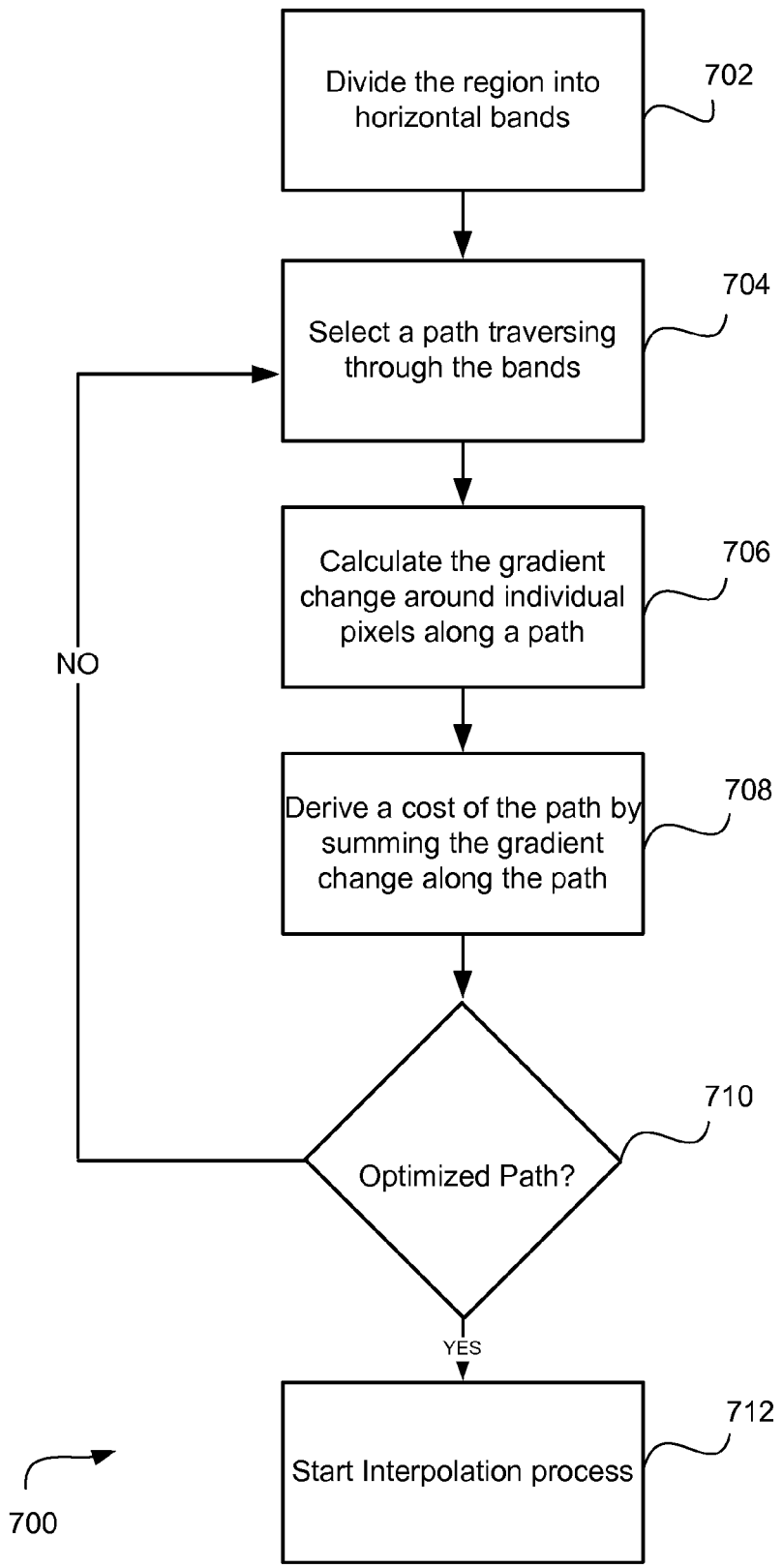
FIG. 7 is a simplified flow diagram, illustrating a process for deriving an optimized path that avoids the noisy paths.

FIG. 7 is a simplified flow diagram, illustrating a method 700 for deriving an optimized path that avoids noise. The method 700 is performed by processing logic that comprise hardware (circuitry, dedicated logic, etc.), software (such as is run on a general purpose computing system or a dedicated machine), firmware (embedded software), or any combination thereof. In one embodiment, the method 700 is performed by device 1000 of FIG. 10.

For purposes of illustration, while discussing the boundaries in FIG. 7, the two boundaries are referred to as being placed horizontally at the top and the bottom spaces at opposing sides of the symbols and the optimized paths are generated from left to right. However, it is well understood by one skilled in the art that the boundaries may be placed vertically binding the sequence of symbols on each side. For instance, for some Asian characters and symbols that are written vertically, the boundaries might be vertically drawn on the sides from top to bottom. Similarly, for some Middle-Eastern scripts that are written from right to left, it might be advantageous to search and generate the optimized path representing the boundaries from right to left.

Referring to FIG. 7, at block 702, the blending system divides the search regions into top and bottom horizontal bands, masking out the region with area mostly covered by the symbols (as seen in 804). Masking out the region with most of the area covered by the symbols may refer to disregarding the pixels in the masked out area while calculating the optimized path. Generating two bands at two opposing edges of the symbols significantly reduces the number of possible paths along the image.

At block 704, the blending system chooses a path that horizontally traverses through each horizontal band. The path is defined as a string of pixels starting from the left edge of the text and extending to the right edge of the text. In equation (1) below, each $p_i$ represents the vertical position of a pixel on the i-th column, n is the length of path, and (a, b) is a search range (band) for path starting from the left edge of the text and extending to the right edge.

$$\mathbb{P} = \{p_1, p_2, \ldots, p_i, \ldots, p_n | p_i \in (a,b)\} \quad (1)$$

At block 706, the blending system calculates the gradient change around individual pixels, along a path. One embodiment of calculating the gradient change is further discussed while discussing FIG. 9 below. At block 708, the system calculates the cost of the path by summing the gradient change of the pixels along the selected path. The cost function for calculating the cost of the path is represented by the following equation, $$\Im(\mathbb{P}) = \Sigma_{i=1}^{n} D(i, p_i) \quad (2)$$

where $D(i, p_i)$ represents a gradient change around a pixel $(i, p_i)$. Therefore, the above equation represents the summation of the gradient change around all the pixels along the chosen path. Once the blending system calculates the cost of the path, the cost is compared against the cost of other paths. If, at block 710, the blending system determines that it did not find an optimized path, the blending routine traverses a new path to find a path with a lower cost representing a lower gradient change (starting back at block 704).

Concepts from dynamic programming may be used for implementing the blending system described in FIG. 7, by segmenting the problem into smaller sub-problems to find both the horizontal bands above and below the text and also the optimized paths in the horizontal bands. The dynamic programming model may dictate the size and direction of the path (block 704) and the frequency of the decision to abandon or continue calculating the gradient change (block 710) along a chosen path.

It should be appreciated that the specific steps illustrated in FIG. 7 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination in between. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 700.

Figure 8:
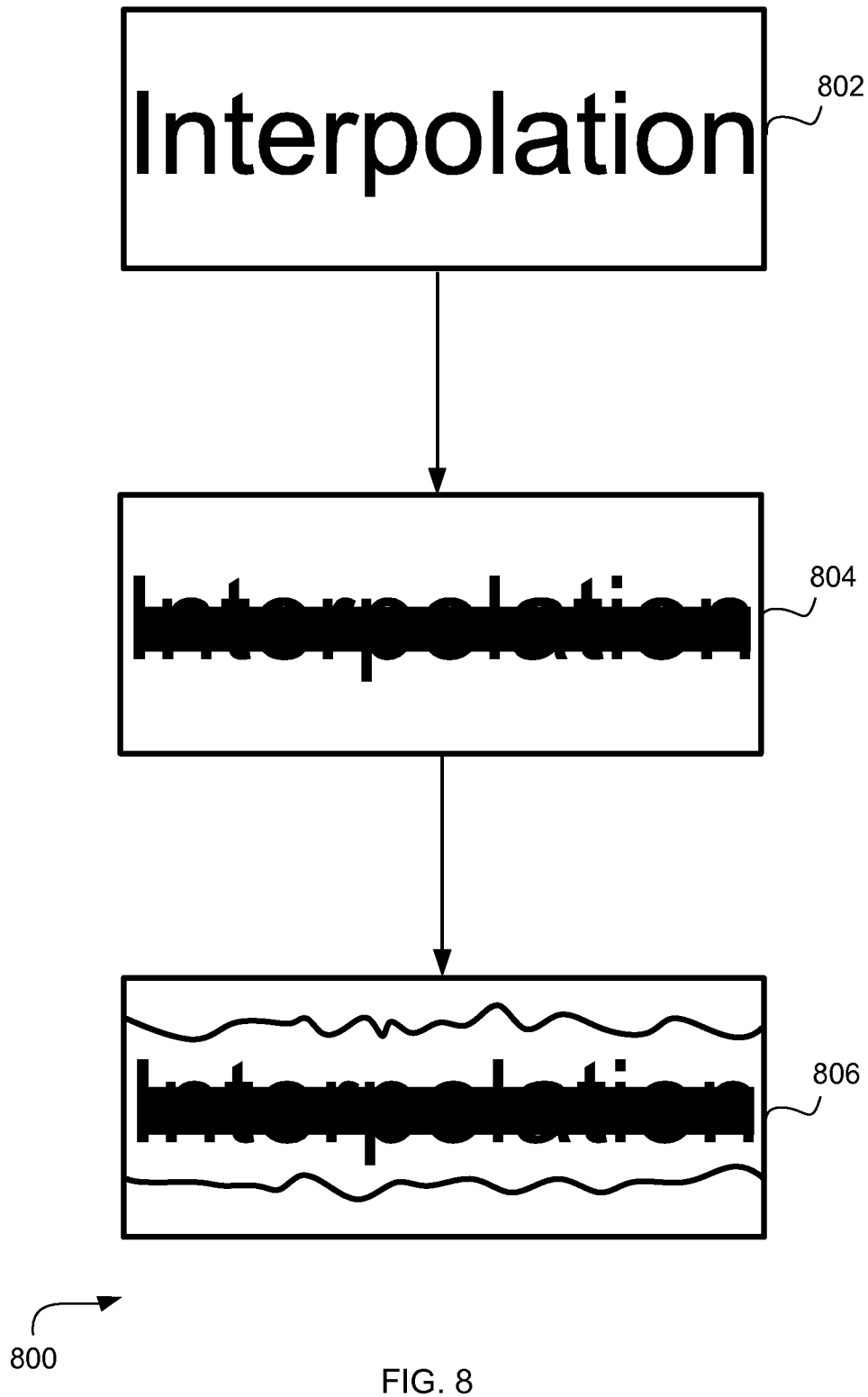
FIG. 8 is a simplified flow diagram, illustrating the progression of an image with text through the process of deriving an optimized path.

FIG. 8 is a flow diagram of an image with text, illustrating the transition steps for finding an optimized path along the top and the bottom regions of the image. At block 802, the image with the text is captured. At block 804, the region with most of the text is masked out to form two narrow bands at the bottom and the top edges of the text. The bands are regions with little or no noise from the symbols. Identifying bands help reduce the search space for the optimal paths. Masking out the region with most of the area covered by the symbols effectively creates two bands on either side of the text. This results in disregarding the pixels in the masked out area while calculating the optimized path. The blending system may further divide the top and the bottom regions into narrower bands (not shown), based on total cost of the gradient change within the narrower bands or by using other suitable techniques. Once the blending system selects narrow bands at the top edge and the bottom edge of the text, an optimized path is generated along each band, as shown at block 806. These optimized paths are used for interpolating the background color of the region between the two paths as described in reference to FIG. 7. Generating these bands on the opposing sides of the symbols is advantageous, since it significantly reduces the number of paths (repetitions of blocks 704-710) that the blending system has to search before finding the optimized path.

Figure 9:
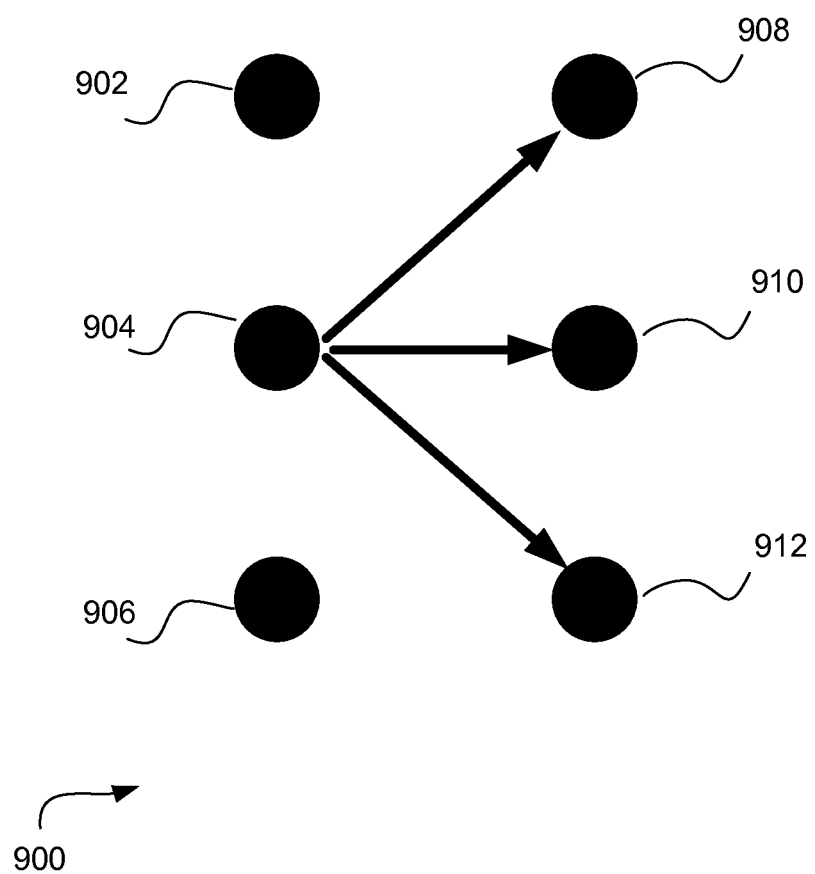
FIG. 9 is a graphic representation of the pixels, illustrating an embodiment of selecting a neighborhood set of pixels and calculating the gradient change around the pixel.

FIG. 9 is a graphical representation of neighboring pixels, illustrating a non-limiting example embodiment of selecting a neighborhood set of pixels and calculating the gradient change around the pixel. In this embodiment, the gradient change around a pixel is calculated by choosing a neighborhood set of pixels around the pixel of interest. The gradient change around the pixel is calculated as the summation of the absolute value of the difference between the pixel of interest and each neighborhood pixel. The method of finding the gradient change around the pixel is represented by the equation, $$D(u,v) = \sum_{(u,v,m,n) \in \mathbb{N}} |C_{(u,v)} - C_{(m,n)}|,$$

where D(u,v) represents a gradient change around a pixel (u,v). (u, v, m, n)∈ℕ means that (m, n) is a neighborhood of (u,v). $C_{(u,v)}$ is the color of a pixel at (u,v), and ℕ is the neighborhood system. Referring to FIG. 9, the gradient change is calculated around pixel 904. Pixel 904 is the pixel of interest and is located at (u,v). Pixels at 902, 906, 908, 910, and 912 are the set of pixels around 904. In one embodiment, the optimization routine chooses only pixels at 908, 910 and 912 to form the neighborhood set of pixels to calculate the gradient change.

Figure 10:
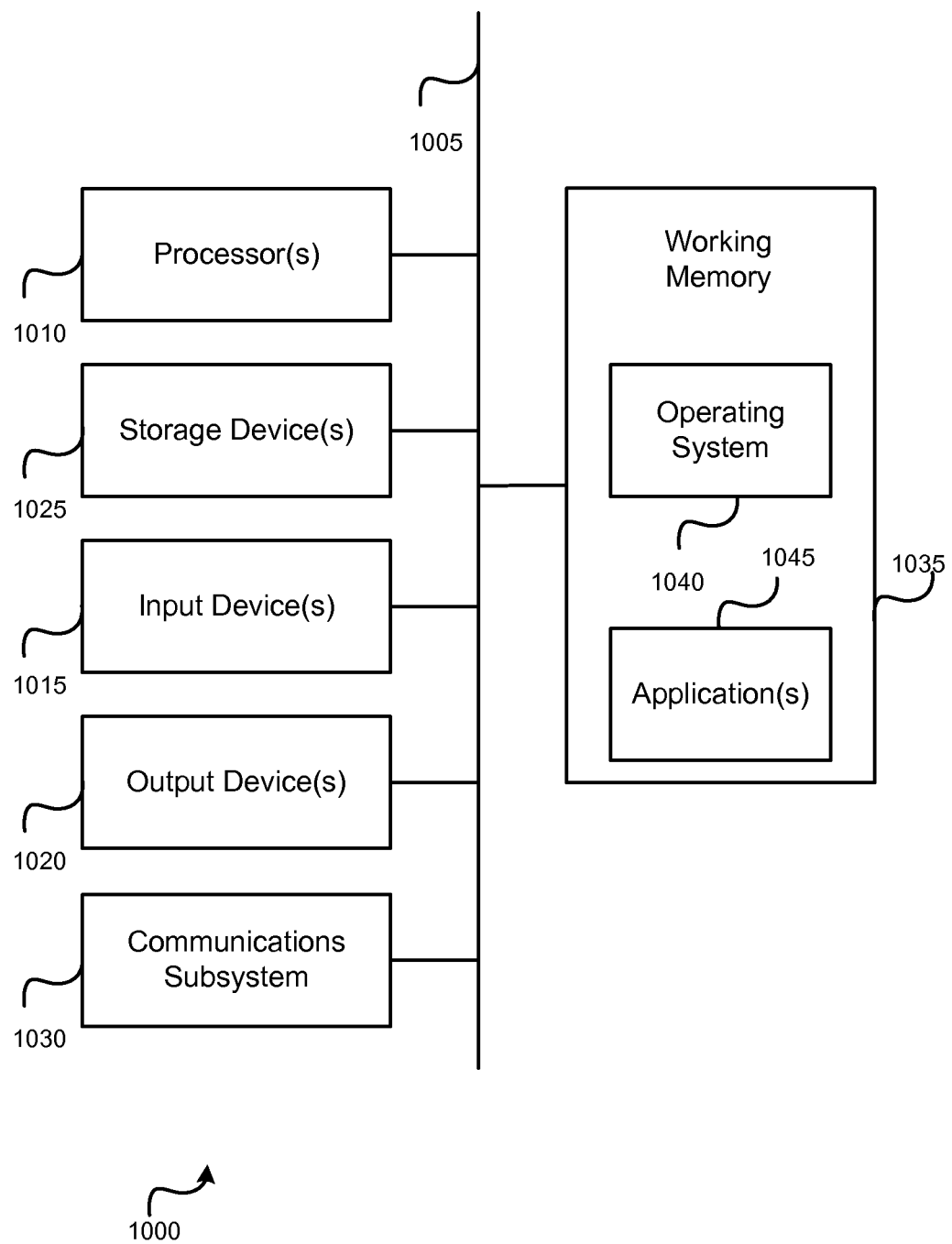
FIG. 10 illustrates an exemplary computer system incorporating parts of the device employed in practicing embodiments of the invention.

A computer system as illustrated in FIG. 10 may be incorporated as part of the previously described computerized device. For example, computer system 1000 can represent some of the components of a hand-held device. A hand-held device may be any computing device with an input sensory unit like a camera and a display unit. Examples of a hand-held device include but are not limited to video game consoles, tablets, smart phones and mobile devices. FIG. 10 provides a schematic illustration of one embodiment of a computer system 1000 that can perform the methods provided by various other embodiments, as described herein, and/or can function as the host computer system, a remote kiosk/terminal, a point-of-sale device, a mobile device, a set-top box and/or a computer system. FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a camera, a mouse, a keyboard and/or the like; and one or more output devices 1020, which can include without limitation a display unit, a printer and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a non-transitory working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1000) to perform methods in accordance with the disclosure. For example, some or all of the procedures of the described methods may be performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communications subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for replacing an at least one symbol in a first image, the method comprising:
   obtaining the first image comprising a plurality of pixels representing the at least one symbol and a plurality of pixels representing a background area;
   defining a first and a second boundary in the first image, wherein the first and the second boundaries are each a path comprising a plurality of pixels that minimizes a cost associated with change in color for the path and each of the paths are positioned on opposite sides of the at least one symbol;
   generating a plurality of pixels representing an at least one translated symbol of the at least one symbol;
   generating a plurality of pixels representing an augmented version of the background area, by interpolating a plurality of background pixel values between the first and the second boundaries; and
   constructing a second image comprising the plurality of pixels representing the at least one translated symbol and the plurality of pixels representing the augmented version of the background area.

2. The method of claim 1, wherein each of the first and second boundaries is defined as a string of pixels along one side of the at least one symbol.

3. The method of claim 1, wherein the cost associated with the path is defined as a path of pixels that minimizes a sum of gradient change in pixel color of a plurality of pixels along the path.

4. The method of claim 1, wherein defining the first and the second boundary in the first image comprises:
   defining a first and a second band at opposing sides of the at least one symbol;
   selecting at least a first path that traverses through the first band and at least a second path that traverses through the second band;
   deriving a cost for the at least first path and the at least second path by summing gradient change in pixel color of a plurality of pixels along each path; and
   selecting the path with a lowest cost from the first band as the first boundary and the path with a lowest cost from the second band as the second boundary.

5. The method of claim 1, wherein interpolating background pixel values utilizes linear interpolation.

6. The method of claim 1, wherein interpolating background pixel values utilizes non-linear interpolation.

7. The method of claim 1, wherein the at least one symbol comprises an at least one text character in a first human language, and the at least one translated symbol comprises an at least one text character in a second human language.

8. A device, comprising:
   a processor;
   an input device coupled to the processor;
   an output device coupled to the processor; and
   a non-transitory computer readable storage medium coupled to the processor, wherein the non-transitory computer readable storage medium comprises code executable by the processor for implementing a method comprising:
      obtaining a first image comprising a plurality of pixels representing an at least one symbol and a plurality of pixels representing a background area;
      defining a first and a second boundary in the first image, wherein the first and the second boundaries are each a path comprising a plurality of pixels that minimizes a cost associated with change in color for the path and each of the paths are positioned on opposite sides of the at least one symbol;
      generating a plurality of pixels representing an at least one translated symbol of the at least one symbol;
      generating a plurality of pixels representing an augmented version of the background area, by interpolating a plurality of background pixel values between the first and the second boundaries; and
      constructing a second image comprising the plurality of pixels representing the at least one translated symbol and the plurality of pixels representing the augmented version of the background area.

9. The device of claim 8, wherein each of the first and second boundaries is defined as a string of pixels along one side of the at least one symbol.

10. The method of claim 8, wherein the cost associated with the path is defined as a path of pixels that minimizes a sum of gradient change in pixel color of a plurality of pixels along the path.

11. The device of claim 8, wherein defining the first and the second boundary in the first image comprises:
   defining a first and a second band at opposing sides of the at least one symbol;
   selecting at least a first path that traverses through the first band and at least a second path that traverses through the second band;
   deriving a cost for the at least first path and the at least second path by summing gradient change in pixel color of a plurality of pixels along each path; and
   selecting the path with a lowest cost from the first band as the first boundary and the path with a lowest cost from the second band as the second boundary.

12. The device of claim 8, wherein interpolating background pixel values utilizes linear interpolation.

13. The device of claim 8, wherein interpolating background pixel values utilizes non-linear interpolation.

14. The device of claim 8, wherein the at least one symbol comprises an at least one text character in a first human language, and the at least one translated symbol comprises an at least one text character in a second human language.

15. A non-transitory computer readable storage medium coupled to a processor, wherein the non-transitory computer readable storage medium comprises a computer program executable by the processor for implementing a method comprising:
   obtaining a first image comprising a plurality of pixels representing an at least one symbol and a plurality of pixels representing a background area;
   defining a first and a second boundary in the first image, wherein the first and the second boundaries are each a path comprising a plurality of pixels that minimizes a cost associated with change in color for the path and each of the paths are positioned on opposite sides of the at least one symbol;
   generating a plurality of pixels representing an at least one translated symbol of the at least one symbol;

generating a plurality of pixels representing an augmented version of the background area, by interpolating a plurality of background pixel values between the first and the second boundaries; and constructing a second image comprising the plurality of pixels representing the at least one translated symbol and the plurality of pixels representing the augmented version of the background area.

16. The computer program of claim 15, wherein each of the first and second boundaries is defined as a string of pixels along one side of the at least one symbol.

17. The computer program of claim 15, wherein the cost associated with the path is defined as a path of pixels that minimizes a sum of gradient change in pixel color of a plurality of pixels along the path.

18. The computer program of claim 15, wherein defining the first and the second boundary in the first image comprises:
    defining a first and a second band at opposing sides of the at least one symbol;
    selecting at least a first path that traverses through the first band and at least a second path that traverses through the second band;
    deriving a cost for the at least first path and the at least second path by summing gradient change in pixel color of a plurality of pixels along each path; and
    selecting the path with a lowest cost from the first band as the first boundary and the path with a lowest cost from the second band as the second boundary.

19. The computer program of claim 15, wherein interpolating background pixel values utilizes linear interpolation.

20. The computer program of claim 15, wherein interpolating background pixel values utilizes non-linear interpolation.

21. The computer program of claim 15, wherein the at least one symbol comprises an at least one text character in a first human language, and the at least one translated symbol comprises an at least one text character in a second human language.

22. An apparatus for replacing an at least one symbol in a first image, the method comprising:
    means for obtaining the first image comprising a plurality of pixels representing the at least one symbol and a plurality of pixels representing a background area;
    means for defining a first and a second boundary in the first image, wherein the first and the second boundaries are each a path comprising a plurality of pixels that minimizes a cost associated with change in color for the path and each of the paths are positioned on opposite sides of the at least one symbol;
    means for generating a plurality of pixels representing an at least one translated symbol of the at least one symbol;
    means for generating a plurality of pixels representing an augmented version of the background area, by interpolating a plurality of background pixel values between the first and the second boundaries; and
    means for constructing a second image comprising the plurality of pixels representing the at least one translated symbol and the plurality of pixels representing the augmented version of the background area.

23. The apparatus of claim 22, wherein each of the first and second boundaries is defined as a string of pixels along one side of the at least one symbol.

24. The apparatus of claim 22, wherein the cost associated with the path is defined as a path of pixels that minimizes a sum of gradient change in pixel color of a plurality of pixels along the path.

25. The apparatus of claim 22, wherein defining the first and the second boundary in the first image comprises:
    means for defining a first and a second band at opposing sides of the at least one symbol;
    means for selecting at least a first path that traverses through the first band and at least a second path that traverses through the second band;
    means for deriving a cost for the at least first path and the at least second path by summing gradient change in pixel color of a plurality of pixels along each path; and
    means for selecting the path with a lowest cost from the first band as the first boundary and the path with a lowest cost from the second band as the second boundary.

26. The apparatus of claim 22, wherein interpolating background pixel values utilizes linear interpolation.

27. The apparatus of claim 22, wherein interpolating background pixel values utilizes non-linear interpolation.

28. The apparatus of claim 22, wherein the at least one symbol comprises an at least one text character in a first human language, and the at least one translated symbol comprises an at least one text character in a second human language.

* * * * *